(12) United States Patent
Gaskill et al.

(10) Patent No.: US 10,327,417 B2
(45) Date of Patent: Jun. 25, 2019

(54) STATIC ELECTRICITY DISCHARGING PET BED

(71) Applicants: Thomas J. Gaskill, Haddonfield, NJ (US); James S. Gatti, Delran, NJ (US)

(72) Inventors: Thomas J. Gaskill, Haddonfield, NJ (US); James S. Gatti, Delran, NJ (US)

(*) Notice: Subject to any disclaimer, the term of this patent is extended or adjusted under 35 U.S.C. 154(b) by 119 days.

(21) Appl. No.: 15/724,375

(22) Filed: Oct. 4, 2017

(65) Prior Publication Data

US 2019/0098860 A1 Apr. 4, 2019

(51) Int. Cl.
*A01K 1/015* (2006.01)
*A01K 1/035* (2006.01)
*H05F 3/02* (2006.01)

(52) U.S. Cl.
CPC .............. *A01K 1/035* (2013.01); *H05F 3/02* (2013.01); *A01K 1/015* (2013.01)

(58) Field of Classification Search
CPC ...... A01K 1/0152; A01K 1/0353; H05F 3/025
USPC .................................. 119/28.5, 471; 5/420
See application file for complete search history.

(56) References Cited

U.S. PATENT DOCUMENTS

| | | | | | |
|---|---|---|---|---|---|
| 4,162,393 | A | * | 7/1979 | Balboni | A47C 21/048 219/217 |
| 4,241,829 | A | * | 12/1980 | Hardy | B65D 5/563 206/523 |
| 4,773,534 | A | * | 9/1988 | DeHeras | H05K 9/0067 206/522 |
| 4,883,172 | A | * | 11/1989 | Young | B65D 81/30 206/721 |
| 5,525,411 | A | * | 6/1996 | Stewart | A47C 31/004 442/56 |
| 6,196,156 | B1 | * | 3/2001 | Denesuk | A01K 1/0152 119/28.5 |
| 6,591,560 | B2 | * | 7/2003 | Burke | A47G 27/0231 428/159 |
| 6,801,418 | B1 | * | 10/2004 | Epstein | H05K 9/0066 174/51 |
| 2007/0107662 | A1 | * | 5/2007 | Queen | A01K 1/0353 119/28.5 |

* cited by examiner

*Primary Examiner* — Yvonne R Abbott-Lewis
(74) *Attorney, Agent, or Firm* — Stuart M. Goldstein

(57) ABSTRACT

A static electricity discharging pet bed has a foam-like cushion pad, an inner cover fabricated of waterproof, antibacterial, anti-fungal, and anti-urine material. An outer cover encompasses the inner cover. The outer cover is fabricated of an electrical conductive material designed to conduct static electricity from the pet bed through an electrical conductive conductor, to an electrical conductive ground wire, and then to a ground only plug connected to a grounded electrical outlet. The result is that when a dog or like furry pet is positioned on the pet bed, static electricity affecting the animal is drained to electrical ground. In this same manner, an "Earthing" effect provides a number of healthful benefits to the pet as well.

9 Claims, 5 Drawing Sheets

STATIC ELECTRICITY DISCHARGING PET BED

FIELD OF THE INVENTION

The present invention relates to a product which contributes to the safety and comfort of pets, particularly dogs and cats.

BACKGROUND OF THE INVENTION

Severe weather, especially storms and similar meteorological events which result in abnormally loud thunder and frequent lightening, have adverse effects on many fur-covered pets like dogs and cats. In fact, studies have shown that thunderstorms are one of the top causes of anxiety among such domesticated animals.

However, although loud noise and thunderstorm induced tumult take their toll on pets, it is the static electricity in the air during a storm which is a major, yet heretofore unaddressed problem. The highly electrically charged atmosphere during a thunder or lighting storm causes tingling and general discomfort through the fur of the animal. Moreover, electric shocks often accompany this discomfort during situations in which there is extreme lightening.

Many animals affected by static electricity during storms seek solace in locations which are grounded, such as sinks, bathtubs and basements. Of course, most pet owners would prefer that their dog or cat not run in panic around the house, looking for a comfortable and safe place to stay during and even after an electrical storm; the animal ultimately ending up in an unwanted location. There is thus a need for a means to provide both comfort to a pet when the atmosphere is charged with static electricity, and is also a safe and acceptable haven for the animal.

SUMMARY OF THE INVENTION

It is thus the object of the present invention to provide a product which eliminates the discomfort to a pet caused by static electricity during thunder and lightning storms.

It is the object of the present invention to provide a static electricity discharging pet bed which effectively and efficiently discharges static electricity to ground, such that when a pet is seated on the pet bed, the bed serves to discharge the atmospheric electricity felt by the pet.

These and other objects are accomplished by the present invention, a static electricity discharging pet bed having a foam-like cushion pad, an inner cover fabricated of waterproof, anti-bacterial, anti-fungal, and anti-urine material. An outer cover encompasses the inner cover. The outer cover is fabricated of an electrical conductive material designed to conduct static electricity from the pet bed through an electrical conductive conductor, to an electrical conductive ground wire, and then to a ground only plug connected to an electrical outlet. The result is that when a dog or like furry pet is positioned on the pet bed, static electricity affecting the animal is drained to electrical ground.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
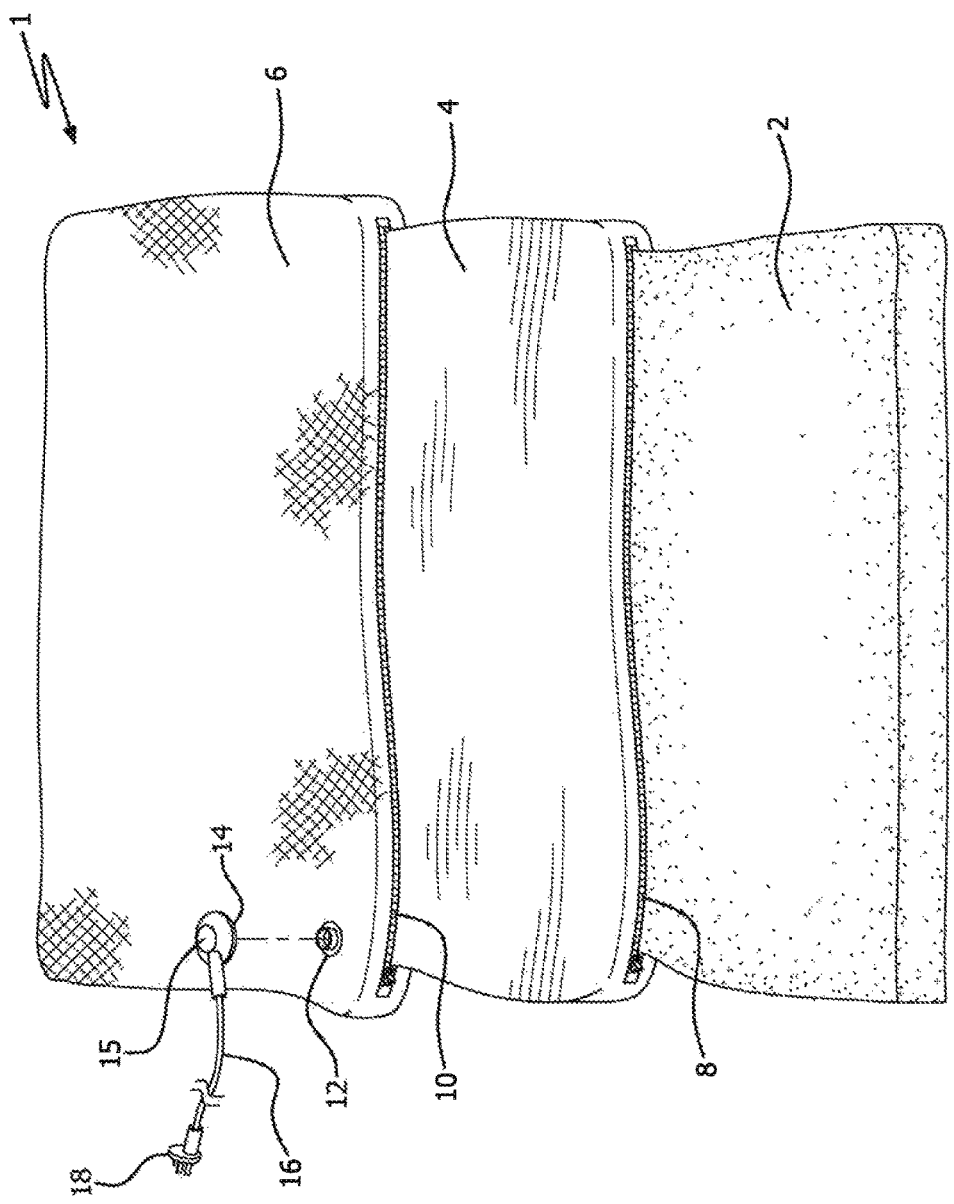
FIG. 1 shows the components of the pet bed of the present invention.
Figure 2:
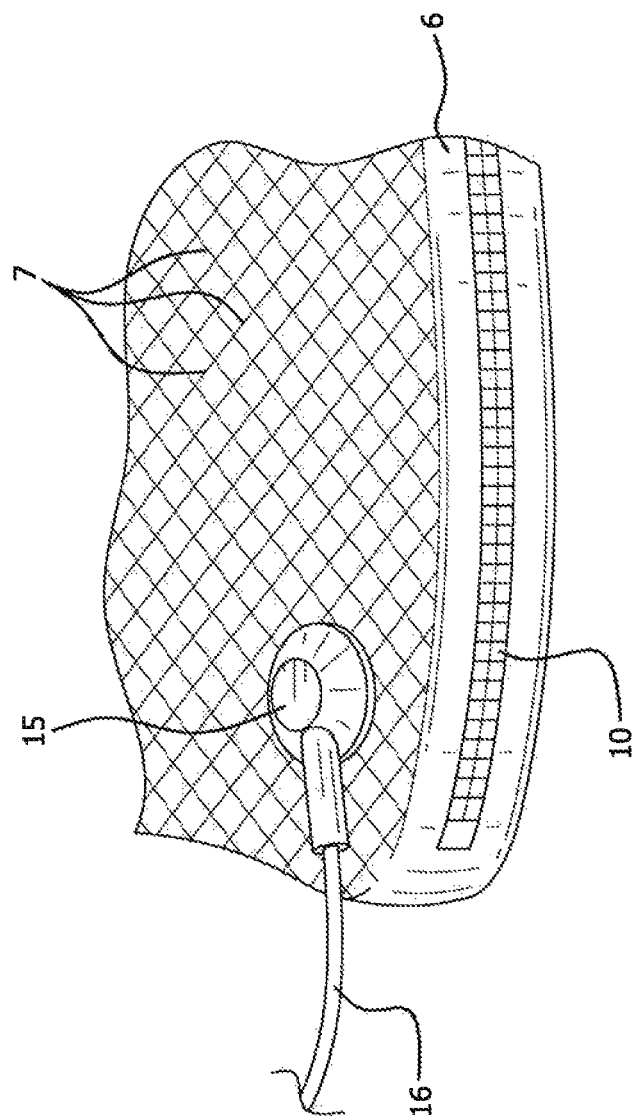
FIG. 2 is a close-up view of the electrical connection of the pet bed of the present invention to its ground wire.
Figure 3:
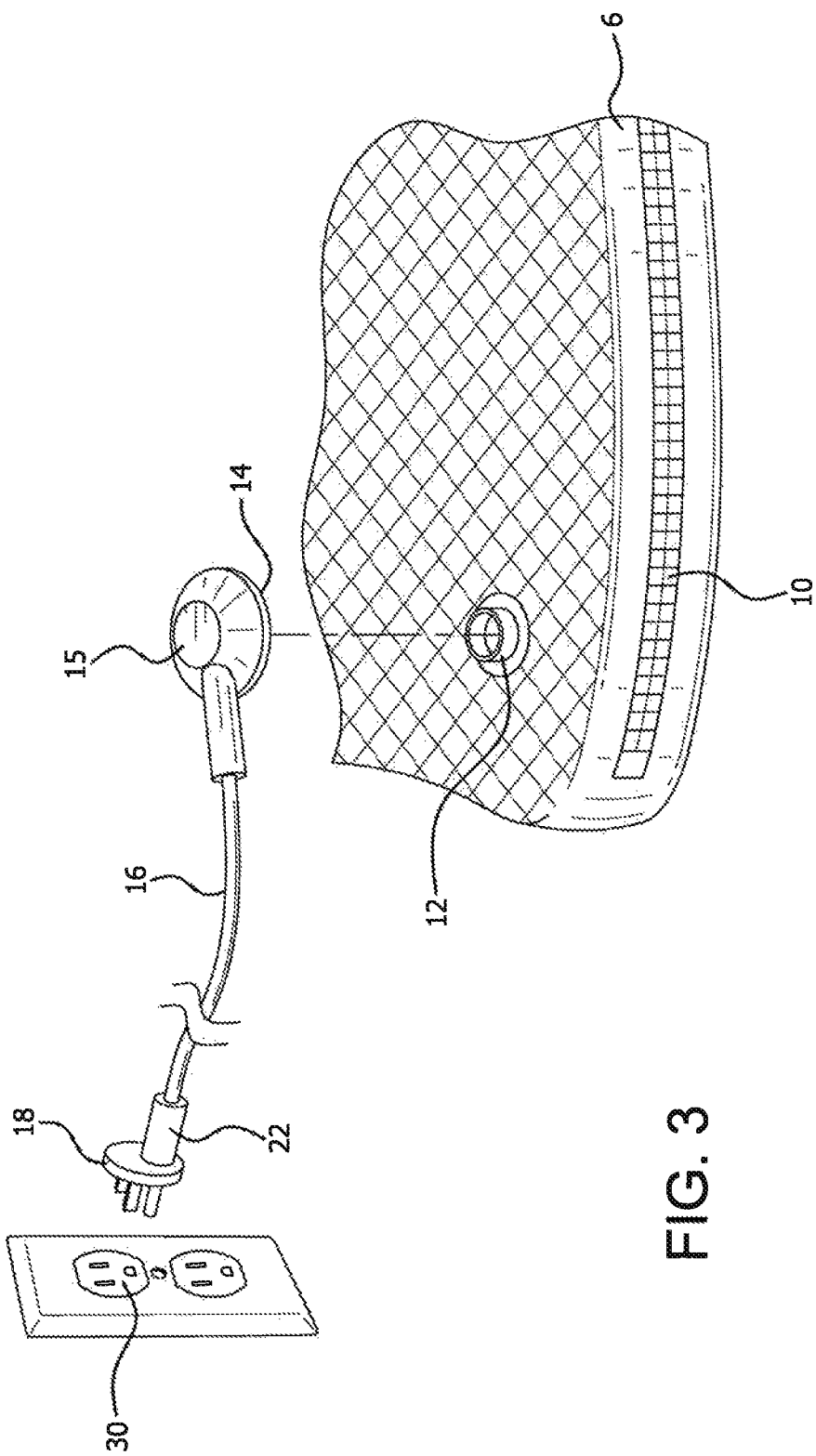
FIG. 3 is another view of the pet bed of the present invention illustrating the electrical connection between the pet bed and an electrical outlet.
Figure 4:
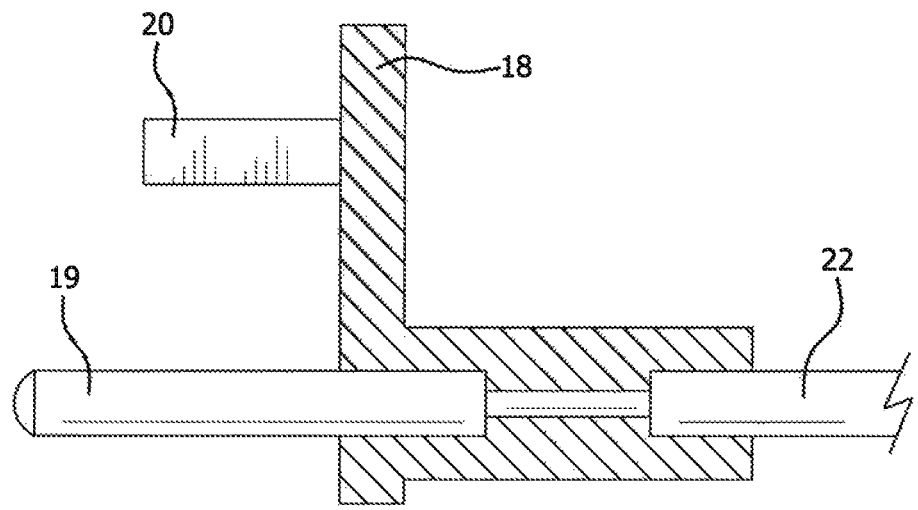
FIG. 4 is a partial cross-sectional view of the ground plug connection utilized with the pet bed of the present invention.
Figure 5:
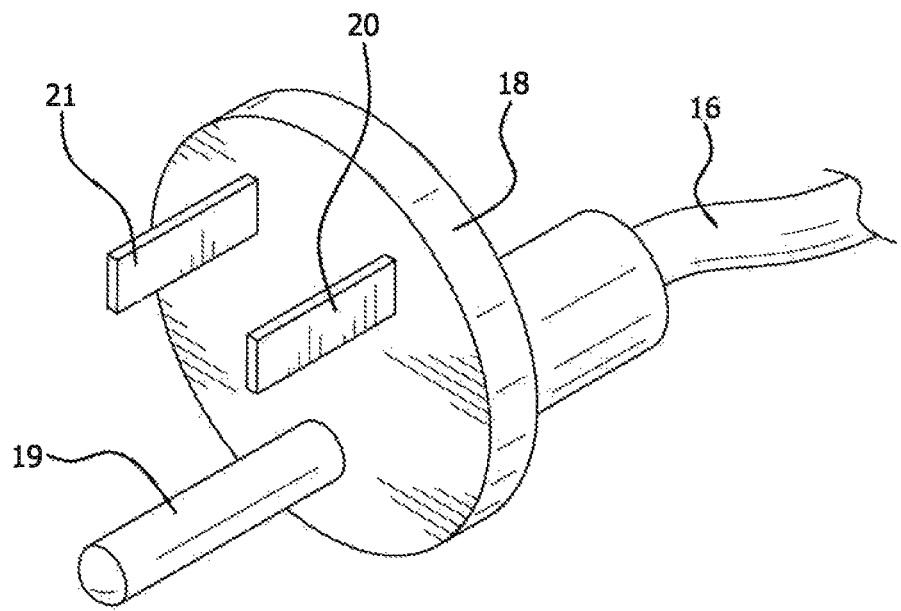
FIG. 5 is an isometric view of the ground plug utilized with the pet bed of the present invention.
Figure 6:
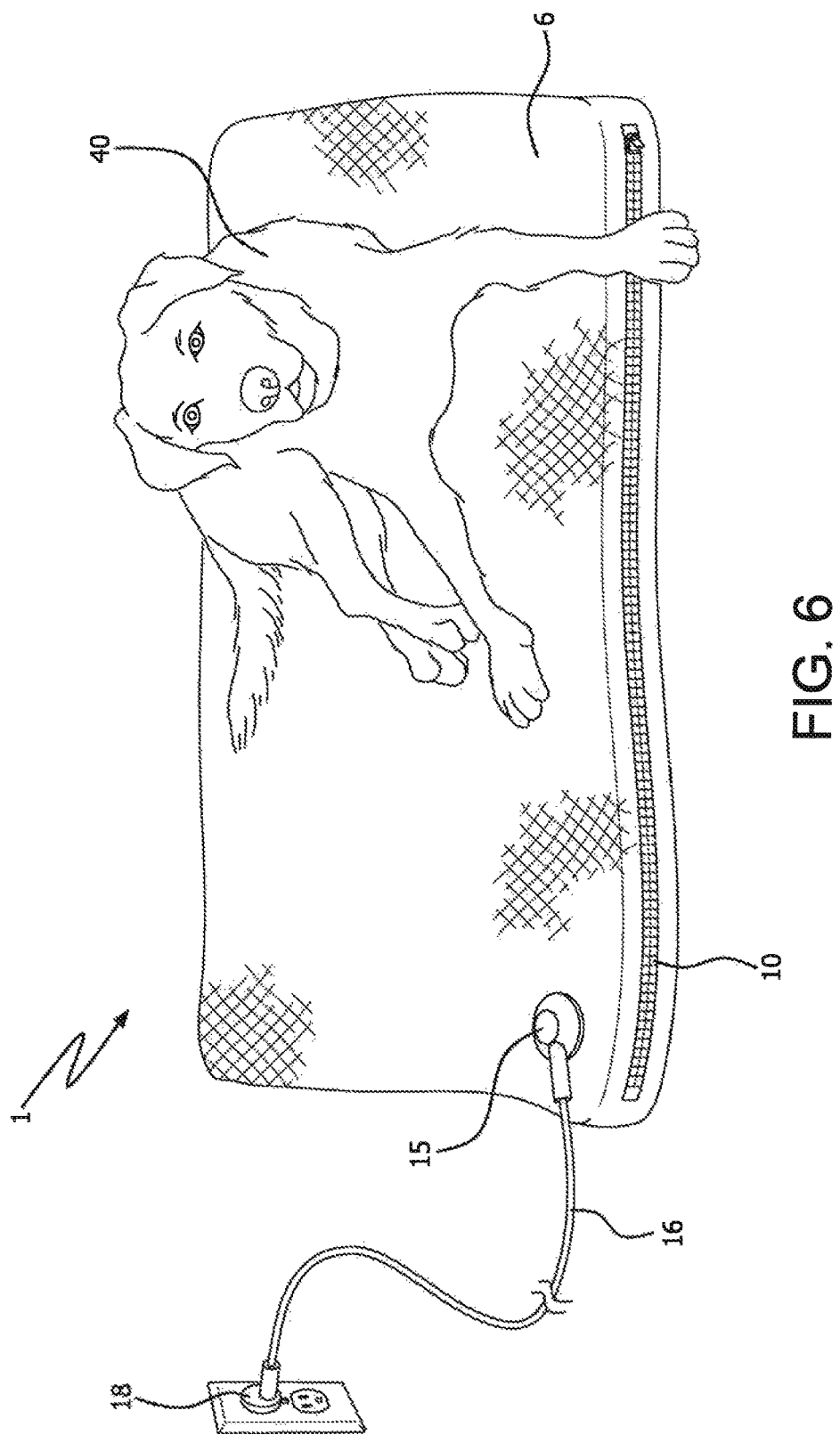
FIG. 6 illustrates the connections which result in static electricity being discharged by the pet bed of the present invention.

Pet bed 1 comprises high density memory foam-like cushion pad 2 configured to be inserted into and encompassed by inner cover 4, which itself is configured to be inserted into and encompassed by outer cover 6. Attachment means in the form of zippers 8 and 10 secure pad 2 within inner cover 4 and pad 2 and inner cover 4 within outer cover 6. It is contemplated that snaps, buttons, hook/eye connectors or equivalent attachments can be utilized in lieu of zippers.

Inner cover 4 is fabricated of waterproof, anti-bacterial, anti-fungal, urine resistant material. Outer cover 6 is fabricated of an electrical conductive material. For example, it is anticipated that the outer cover could be made of 100% cotton with embedded silver thread 7.

Outer cover 6 also comprises electrical conductive connector 12 attached to its outer surface. Conductive connector 12 can be the male or female section of a snap fastener, configured to be removeably connected to a corresponding male or female section of snap fastener 14 at one end of ground wire 16.

Resistor 15 is a one megohm resistor embedded in snap fastener 14, also located at one end of electrical ground wire 16. Ground only plug 18 is located at the second end of ground wire 16, optionally connected to the ground wire via banana connector 22. Ground plug 18 is for ground connection only. Prongs 20 and 21 are made of non-conductive material.

In use, cushion pad 2 is positioned and secured by zipper 8 within inner cover 4 and both the pad and inner cover are positioned within and secured by zipper 10 within outer cover 6. Snap fastener 14 is attached to conductive connector 12. Ground wire 16, extending from snap fastener 14 with embedded resister 15, is plugged into electrical outlet 30 by means of ground only plug 18.

Static electricity in the air and around and on pet 40 is thus absorbed by pet bed 1, via electrical conductive material 7 in outer cover 6, and discharged through resistor 14, to ground wire 16, ground plug 18, and ultimately to ground at outlet 30. The static electricity, so bothersome to pets, is thereby discharged from the pet bed, the ambient atmosphere, and thus from the pet itself.

Pet bed 1 also provides "Earthing" for the pet. Earthing is a process in which the body is put in direct and uninterrupted contact with the earth. Pet bed 1 creates a direct path from conductive outer cover 6, through ground wire 16, through ground only plug 18, and then to termination at earth ground. Benefits attributed to Earthing are reduced inflammation, reduced chronic pain, improved sleeping, increased energy, lowered stress, muscle tension relief, and improved blood viscosity.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The inventioin claimed is:

1. A pet bed for discharging static electricity, said pet bed comprising:
    a foam-like cushion pad;
    an inner cover fabricated of waterproof, anti-bacterial, anti-fungal material, said cover being configured to encompass the foam cushion pad;
    an outer cover configured to encompass the inner cover, said outer cover fabricated of an electrical conductive material and having an electrical conductive connector attached to its outer surface;
    removable attachment means on the inner cover for securing the cushion pad within the inner cover, wherein when the attachment means is detached, the cushion pad can be removed from the inner cover; and
    an electrical conductive ground wire having two ends, a resistor at one end configured to be removeably attached to the electrical conductive connector nd a ground plug connected to the second end, whereby static electricity is collected by the outer cover and discharged to the ground wire and then to the ground plug for discharging static electricity from the pet bed and the ambient atmosphere around the pet bed.

2. The pet bed as in claim 1 further comprising a banana connector located at the second end of the ground wire, the banana connector being configured to be secured to the ground plug adaptor.

3. The pet bed as in claim 1 wherein the conductive connector comprises a first section of a snap fastener and wherein the resistor is embedded within a second section of a snap fastener configured to be removably connected to the first section of the snap fastener.

4. The pet bed as in claim 1 wherein the material of the outer cover is 100% cotton with embedded silver thread.

5. A pet bed for discharging static electricity, said pet bed comprising:
    a foam-like cushion pad;
    an inner cover fabricated of waterproof, anti-bacterial, anti-fungal material, said cover being configured to encompass the foam cushion pad;
    an outer cover configured to encompass the inner cover, said outer cover fabricated of an electrical conductive material and having an electrical conductive connector attached to its outer surface;
    removable attachment means on the outer cover for securing the inner cover within the outer cover, wherein when the attachment means is detached, the cushion pad can be removed from the outer cover; and
    an electrical conductive ground wire having two ends, a resistor at one end configured to be removeably attached to the electrical conductive connector and a ground plug connected to the second end, whereby static electricity is collected by the outer cover and discharged to the ground wire and then to the ground plug for discharging static electricity from the pet bed and the ambient atmosphere around the pet bed.

6. The pet bed as in claim 5 further comprising second removable attachment means on the inner cover for securing the custom pad within the inner cover, wherein when the second attachment means is detached, the cushion pad can be removed from the inner cover.

7. The pet bed as in claim 5 further comprising a banana connector located at the second end of the ground wire, the banana connector being configured to be secured to the ground plug adaptor.

8. The pet bed as in claim 5 wherein the conductive connector comprises a first section of a snap fastener and wherein the resistor is embedded within a second section of a snap fastener configured to be removably connected to the first section of the snap fastener.

9. The pet bed as in claim 5 wherein the material of the outer cover is 100% cotton with embedded silver thread.

* * * * *